United States Patent [19]
Fernandez

[11] Patent Number: 5,371,453
[45] Date of Patent: Dec. 6, 1994

[54] BATTERY CHARGER SYSTEM WITH COMMON CHARGE AND DATA EXCHANGE PORT

[75] Inventor: Jose M. Fernandez, Plantation, Fla.

[73] Assignee: Motorola, Inc., Schaumburg, Ill.

[21] Appl. No.: 10,049

[22] Filed: Jan. 28, 1993

[51] Int. Cl.$^5$ .............................................. H02J 1/00
[52] U.S. Cl. ............................................ 320/5; 320/35
[58] Field of Search ................... 320/5, 6, 15, 22, 23, 320/24, 2, 35, 36, ; 429/7

[56] References Cited

U.S. PATENT DOCUMENTS

| | | | |
|---|---|---|---|
| 3,667,026 | 5/1972 | Bogut | 320/36 |
| 4,578,628 | 3/1986 | Siwiak | 320/2 |
| 4,667,143 | 5/1987 | Cooper et al. | 320/22 |
| 4,680,527 | 7/1987 | Benenati | 320/2 |
| 4,727,306 | 2/1988 | Misak et al. | 320/35 |
| 4,965,738 | 10/1990 | Bauer et al. | 320/39 X |
| 5,200,686 | 4/1993 | Lee | 320/2 |

FOREIGN PATENT DOCUMENTS

| | | | |
|---|---|---|---|
| 0254934 | 10/1990 | Japan | 320/35 |
| 0648520 | 3/1985 | Switzerland | 320/5 |
| 2175759 | 12/1986 | United Kingdom | 320/2 |
| 2011680 | 7/1992 | WIPO | 320/2 |

*Primary Examiner*—Kristine L. Peckman
*Attorney, Agent, or Firm*—Robert S. Babayi; Pedro P. Hernandez

[57] ABSTRACT

A battery unit charger system is provided which includes a charger (110) for supplying charge current and a battery (120) having a memory (122) for storing battery-related information. The charger (110) includes a controller which exchanges the battery-related information with the memory (122) and in response thereto, controls overall operation of the charger (120). The battery (120) includes a common battery port (126) for selectively receiving charge current and for exchanging data with the charger (120). The controller cuts off the supply of charge current when data is being exchanged with the memory through the common port (126).

4 Claims, 1 Drawing Sheet

BATTERY CHARGER SYSTEM WITH COMMON CHARGE AND DATA EXCHANGE PORT

TECHNICAL FIELD

This invention relates in general to rechargeable batteries and battery chargers and more specifically, to operative rechargeable battery systems for facilitating battery charging.

BACKGROUND

Portable devices routinely depend upon batteries as a power source. To ease battery replacement costs, rechargeable batteries have found wide utility in powering contemporary consumer and business products. For example, nickel cadmium batteries may be repeatedly used to energize computers, radios, pagers, and other such devices. As is well known, rechargeable batteries may be readily re-energized after use (i.e., after discharge) via a battery charger.

It is often necessary for the charger to retrieve charge information about the battery before or during the charge process. The charger uses the retrieved information to properly charge the battery in accordance with a predetermined charging algorithm. The charger's charging algorithm often requires certain battery parameters, such as battery voltage differential ($\Delta V$) or battery temperature differential ($\Delta T$) which are obtained during the charging process. The ($\Delta T$) is determined by monitoring the battery temperature. The battery temperature is also monitored to prevent explosion of an overheated battery.

Some chargers require additional battery related information, such as information relating to battery capacity. Battery capacity informs the charger as to how much current should be supplied to the battery. For example, based on battery capacity, the charger would provide a substantially higher charge rate to a 1600 mA/Hour than to a 900 mA/Hour battery.

Modem batteries incorporate memory devices which store a wide array of battery-related information, such as the battery capacity, $\Delta V$, $\Delta t$, manufacturing site code, and etc. The charger usually communicates with the memory by a serial data signal which couples to a battery port. Also, serial communication with the memory often requires a synchronization clock signal which is generally provided by the charger to the battery through another battery port.

Batteries interact with external devices via battery ports located on the battery's housing. These battery ports include charger ports for receiving charge current from the charger, supply ports for supplying the battery power to an external device, and battery information port for exchanging charge related information, such as temperature signal, serial data signal, and clock signal. As such, a conventional battery in addition to the battery supply ports may include a battery charger port, a battery temperature port as well as a plurality of battery information ports, i.e., serial data port and clock signal port. However, it is desired to decrease the number of battery ports necessary for charging the battery. Decreasing the number of battery ports reduces the cost and minimizes the risk of battery terminal corrosion when the battery is used under severe conditions.

SUMMARY OF THE INVENTION

Briefly, according to the invention, there is provided a battery charger system and a battery wherein the battery includes cells having a charge terminal for receiving the charge current and a memory having a memory terminal for exchanging memory signals. The battery also includes a common battery port which is coupled to both the memory terminal and the charge terminal in order to selectively receive charge current and exchange memory signals through the common battery port. The battery charger system includes a controller and a charge current supply which is responsive to the controller for cutting off the charge current when the charger is exchanging data with the memory device.

DETAILED DESCRIPTION OF THE PREFERRED EMBODIMENT

Figure 1:
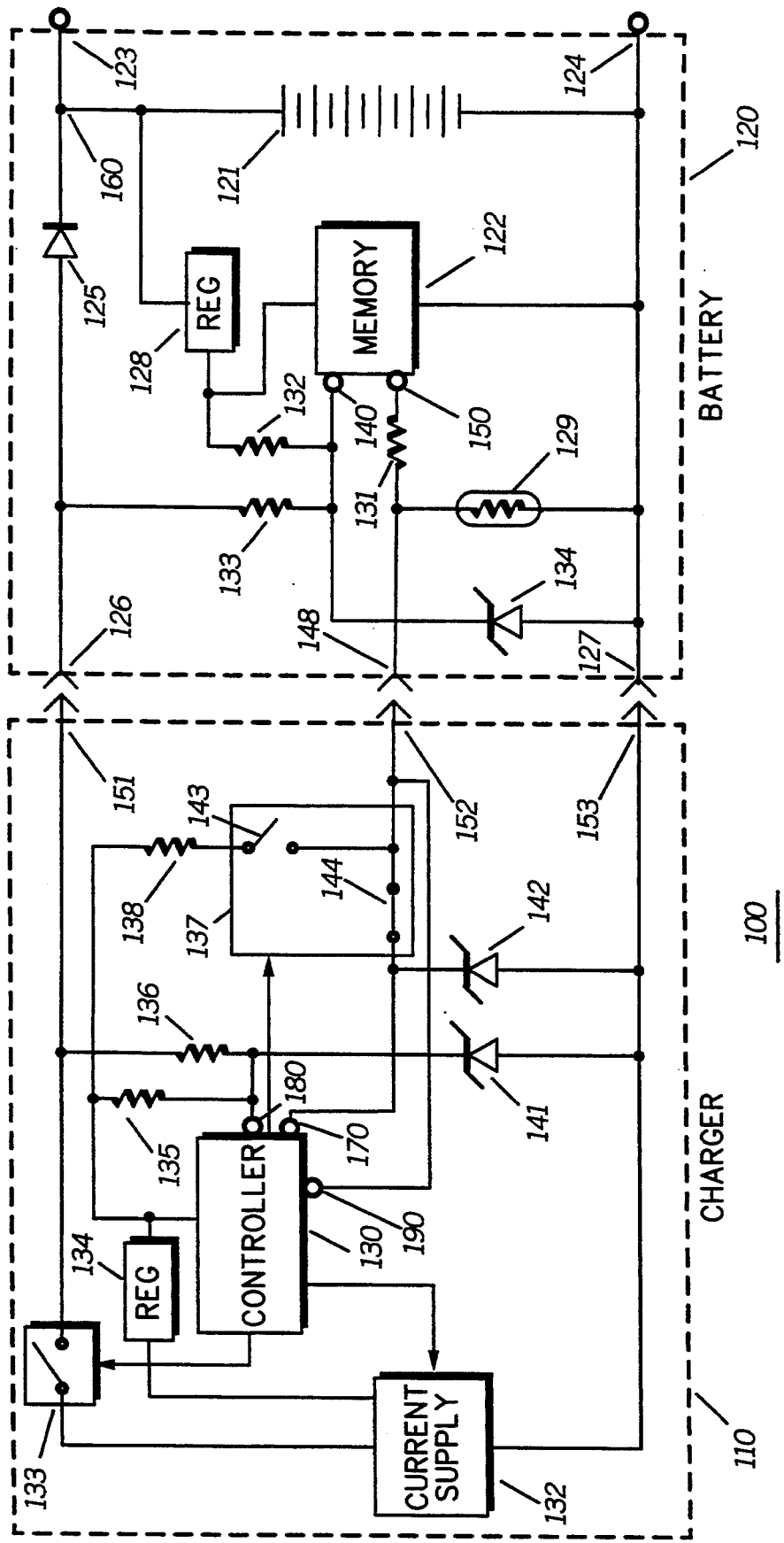
FIG. 1 is a schematic diagram of the battery charger system according to the present invention.

While the specification concludes with claims defining the features of the invention that are regarded as novel, it is believed that the invention will be better understood from a consideration of the following description in conjunction with the sole drawing figure, reference numerals are carried forward.

Referring now to FIG. 1, a battery charger system 100 is shown to include a charger 110 for providing charge current to a battery unit 120. The battery unit 120 includes a plurality of rechargeable power storage cells 121 which include a charge terminal 160 for receiving the charge current through a battery port 126. The battery cells 121 are coupled to power supply ports 123 and 124 which provide the energy from the battery to an external device (not shown). A diode 125 is coupled between the battery port 126 and the charge terminal 160 to prevent cell discharge through the charger circuitry.

The battery unit 120 includes a memory 122 which stores battery related data. The battery related data may comprise the data, in any form, needed for efficiently charging the battery unit 120. The memory 122 may store such information as the battery capacity, $\Delta V$, $\Delta T$, and information relating to battery marketing, such as the place of manufacture and other necessary information. The memory 122 comprises a EEPROM memory, such as a NM24CO memory device series manufactured by National Semiconductor, which is capable of serially exchanging data based on I²C two-wire protocol specification as is well known in the art. The memory 122 includes two memory terminals 140 and 150, comprising a serial data terminal and a synchronization clock terminal for communicating memory signals between an external microprocessor and the memory device. Memory signals as herein referred to include any and all signals necessary for exchanging battery related data with the memory device including but not limited to memory data signal as well as synchronization clock signal. As shown, the data terminal 140 is pulled up via a pull-up resistor 132 and is protected via Zener diode 134. The data terminal 140 is also coupled to the battery port 126 via a current limiting resistor 133 which is used to limit the charge current to the memory when the battery is being charged.

The battery unit 120 also includes a thermistor 129 for providing battery unit temperature signals through a battery port 148. The battery port 148 is also coupled to clock terminal 150 through a current limiting resistor 131.

According to the present invention, the battery port is shared for receiving the charge current and for exchanging memory signals. Similarly, the battery port 148 is shared for providing the battery temperature signal and for receiving the memory clock signal. Accordingly, the number of battery ports for communicating battery related information is substantially reduced as a result of the port sharing arrangement of the present invention.

The selective sharing of the battery ports 126 and 148 is achieved under the control of the charger 110 which interfaces with the battery 120 through three charger ports 151, 152 and 153. When the battery is placed in the charger 110, the charger ports 151, 152 and 153 correspondingly couple to the battery ports 126, 148 and 127 via well-known removable interconnection mechanisms.

The charger 110 includes a controller 130 for controlling charger operation and a current supply 132 for providing the charge current to the battery 120. The controller 130 is a well-known microprocessor, such as the 6800 family of microprocessors manufactured by Motorola, Inc. The controller 130 is programmed in a well-known manner to exchange serial data with the memory 122 through a serial data port 180 and to provide a synchronization clock signal through a controller clock terminal 170. The controller 130 exchanges serial data with the memory 122 through the charger port 151 which is coupled to the battery port 126. The serial data port 180 is pulled up through a pull-up resistor 135 to a voltage supplied by a regulator 134 and couples to the terminal 151 through a current limiting resistor 136. As such, the serial data exchanged between the controller 130 and the memory 122 may be transferred through port 126.

The controller 130 also provides a clock signal to the memory 122 through the charger port 152 which is coupled to battery port 148. A complimentary switch arrangement 137, comprising switches 143 and 144, is coupled to the clock terminal 170 and a pull-up resistor 138 as illustrated. The complementary switch arrangement 137 is responsive to the controller 130 to selectively couple the battery port 148 to either the terminal 170 or the pull-up resistor 138. When the switch 144 is closed, the switch 143 remains open, thus coupling the battery port 148 to the clock terminal 170. Under this condition, the clock signal provided by the controller 130 is coupled to the clock terminal of the memory 122. Conversely, when the switch 144 is opened, the switch 143 closes, pulling up the battery port 148 to allow the controller 130 to receive battery temperature signal. The controller 130 includes an analog-to-digital (A/D) port 190 which directly couples to port 152 for sampling the battery temperature signal provided on the battery port 148. When the battery port 148 is pulled up, the battery temperature signals provided by the thermistor 129 are applied to the port 170, thus allowing the controller to determine the battery temperature.

Protective Zener diodes 141 and 142, respectively, protect the serial data port 180 and clock port 170 as is well known in the art.

A current supply 132 provides the charge current to the battery cells 121 through the charger port 151 which couples to the battery port 126. A switch 133 is coupled between the current supply 132 and the charger port 151 to cut off charge current under the control of the controller 130.

Operationally, the battery charger system 100 operates in one of two modes: charger mode and data exchange mode. In the charger mode, the current supply 132 provides the charge current to the battery cells 131 through the terminal 126 of the battery. The controller 130 exchanges memory signals with the memory 122 through the battery ports 126 and 148. In this mode, the controller 130 provides a control signal to the switch 133 to cut off the supply of charge current from the current supply 132 so that the controller may be able to exchange data with the memory 122. In the data exchange mode, the controller 130 opens the switch 133 in order to prevent disruption of data exchange by the charge current. Also, the controller closes the switch 144 of the complimentary switch arrangement 137 to allow the clock signal to be applied to the memory 122 through the battery port 148. The controller then, periodically transmits a well known data-read command to the memory 122 of the battery port 126 until a response is received from the memory 122 when the assumption is made that the battery unit 120 is present at the charger. Then, the controller performs a memory dump whereby the stored data in the memory 122 are transferred into the controller 130 via the serial data line coupled to the battery port 126. The data contained in the memory 122 provide the controller with necessary information relating to the charge rate, manufacturing information and quality information. These information may include $\Delta(T)$ or $\Delta(V)$ information, manufacturing site information and an array of other information helpful in charging the battery unit 120. The controller 130 then processes the received battery data and gets ready to charge the battery accordingly.

After completing the data exchange with the battery unit 120, the charger 110 enters the charger mode. In the charger mode, the controller 130 closes the switch 133 to provide charge current to the battery cell 121 through the battery port 126. Once the presence of the battery is detected, the controller 130 controls the complementary switch 137 to read the temperature signal as provided by the thermistor 129 through the A/D port 190. The charge current supplied by the current supply 132 is controlled by the controller 130 based upon information provided by the memory 122.

From the foregoing description, it is apparent that a common battery port may be shared for exchanging data as well as for providing charge current and other battery related information. The sharing of the battery ports, according to the disclosed invention, reduces the number of battery contacts, thus reducing the cost and increasing the battery reliability.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A battery unit having at least one battery port, comprising:
   at least one rechargeable power storage cell having a battery terminal for receiving charge current;
   a memory having a memory terminal for exchanging memory signals, said memory terminal comprises a data terminal for exchanging data signals to and from the memory and a clock terminal for receiving a clock signal;

the battery port being coupled to both the memory terminal and the battery terminal for selectively receiving said charge current and said memory signals: and a thermistor for generating a battery temperature signal, and a second port coupled to both the clock terminal and the thermistor for selectively receiving said clock signal and said temperature signal.

2. A battery charger system, comprising:

a battery unit having at least one battery port comprising:

at least one rechargeable power storage cell having a battery terminal for receiving charge current;

a memory having a memory terminal for exchanging memory signals;

said battery port being coupled to both the memory terminal and the battery terminal for selectively receiving said charge current and said memory signals;

a current supply means for supplying the charge current through said battery port;

controller means for exchanging said memory signals through said battery port;

wherein said memory terminal comprises a data terminal for exchanging data signals between the memory and the controller means, and said memory includes a clock terminal for receiving a clock signal from said controller means;

a thermistor for providing a battery temperature signal to said controller means, and a second port-coupled to both the clock terminal and the thermistor for selectively receiving said clock signal and said temperature signal.

3. The battery charger system of claim 2, wherein said current supply means is responsive to said controller means for cutting off the charge current to allow the exchange of said memory signals.

4. A battery charger system, comprising:

a battery unit having at least one battery port comprising:

at least one rechargeable power storage cell having a battery terminal for receiving charge current;

a memory having a memory terminal for exchanging memory signals;

said battery port being coupled to both the memory terminal and the battery terminal for selectively receiving said charge current and said memory signals;

a current supply means for supplying the charge current through said battery port;

controller means for exchanging said memory signals through said battery port;

wherein said memory terminal comprises a data terminal for exchanging data signals between the memory and the controller means, and said memory includes a clock terminal for receiving a clock signal from said controller means;

a thermistor for providing a battery temperature signal to said controller means, and a second port coupled to both the clock terminal and the thermistor for selectively receiving said clock signal and said temperature signal;

a switch responsive to said controller means for cutting off said battery temperature signal to said controller means when the clock signal is generated during exchange of said memory signals.

* * * * *